(12) United States Patent
Courtier et al.

(10) Patent No.: US 12,071,863 B2
(45) Date of Patent: Aug. 27, 2024

(54) PREFORM FOR A COMPOSITE BLADE

(71) Applicant: SAFRAN AIRCRAFT ENGINES, Paris (FR)

(72) Inventors: Vivien Mickaël Courtier, Moissy-Cramayel (FR); Dominique Gerhardt Mayhew, Moissy-Cramayel (FR); Adrien Jacques Philippe Fabre, Moissy-Cramayel (FR); Adrien Louis Nicolas Laurenceau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/753,591

(22) PCT Filed: Sep. 2, 2020

(86) PCT No.: PCT/FR2020/051523
§ 371 (c)(1),
(2) Date: Mar. 8, 2022

(87) PCT Pub. No.: WO2021/048484
PCT Pub. Date: Mar. 18, 2021

(65) Prior Publication Data
US 2022/0333493 A1 Oct. 20, 2022

(30) Foreign Application Priority Data
Sep. 10, 2019 (FR) ........................................ 1909949

(51) Int. Cl.
*F01D 5/28* (2006.01)
*B29C 70/02* (2006.01)
(Continued)

(52) U.S. Cl.
CPC ............ *F01D 5/282* (2013.01); *B29C 70/025* (2013.01); *B29C 70/682* (2013.01); *F01D 5/147* (2013.01);
(Continued)

(58) Field of Classification Search
CPC ........... F01D 5/147; F01D 5/141; F01D 5/282
See application file for complete search history.

(56) References Cited

U.S. PATENT DOCUMENTS

| 4,118,147 A | 10/1978 | Ellis |
| 5,725,355 A * | 3/1998 | Crall ...................... F01D 5/147 |
| | | 416/229 A |

(Continued)

FOREIGN PATENT DOCUMENTS

| CN | 105682903 A | 10/2017 |
| CN | 107548428 A | 12/2019 |

(Continued)

OTHER PUBLICATIONS

French Search Report in Application No. FR 1909949, dated May 12, 2020, 2 pages.

(Continued)

*Primary Examiner* — Michael L Sehn
(74) *Attorney, Agent, or Firm* — Bookoff McAndrews, PLLC

(57) ABSTRACT

Fibrous preform for a composite blade and also a composite blade formed by means of such a preform, a rotor and a rotating machine comprising such a blade, the preform comprising a first longitudinal section, configured to form a blade root, and a second longitudinal section, extending from the first longitudinal section, configured to form a portion of an airfoil, wherein the first longitudinal section has a first thickness at its upper end and wherein the second longitudinal section comprises at least one set-back zone (Continued)

having a thickness at least three times less than the first thickness, said set-back zone occupying at least 50% of the second longitudinal section.

11 Claims, 3 Drawing Sheets

(51) Int. Cl.
*B29C 70/68* (2006.01)
*F01D 5/14* (2006.01)
*B29K 105/08* (2006.01)
*B29K 105/16* (2006.01)
*B29L 31/08* (2006.01)

(52) U.S. Cl.
CPC .. *B29K 2105/0845* (2013.01); *B29K 2105/16* (2013.01); *B29K 2995/0097* (2013.01); *B29L 2031/082* (2013.01); *F05D 2220/36* (2013.01); *F05D 2300/6012* (2013.01); *F05D 2300/603* (2013.01); *F05D 2300/612* (2013.01)

(56) References Cited

U.S. PATENT DOCUMENTS

| | | | |
|---|---|---|---|
| 6,282,786 B1 | 9/2001 | Evans et al. | |
| 10,125,616 B2* | 11/2018 | Rosenau | F04D 29/388 |
| 2016/0159460 A1* | 6/2016 | Laurenceau | B29D 99/0025 |
| | | | 264/103 |
| 2016/0252104 A1 | 9/2016 | Hui et al. | |
| 2020/0300093 A1* | 9/2020 | Drescher | B22F 10/20 |

FOREIGN PATENT DOCUMENTS

| | | |
|---|---|---|
| DE | 2756684 A1 | 6/1978 |
| EP | 1077126 A1 | 2/2001 |
| FR | 3040909 A1 | 3/2017 |
| WO | 2015099861 A2 | 7/2015 |

OTHER PUBLICATIONS

International Search Report and Written Opinion in International Application No. PCT/FR2020/051523, dated Dec. 21, 2020, 14 pages.

Office Action issued in corresponding Chinese Application No. 2023111501744150, mailed on Nov. 15, 2023.

* cited by examiner

[Fig. 1]
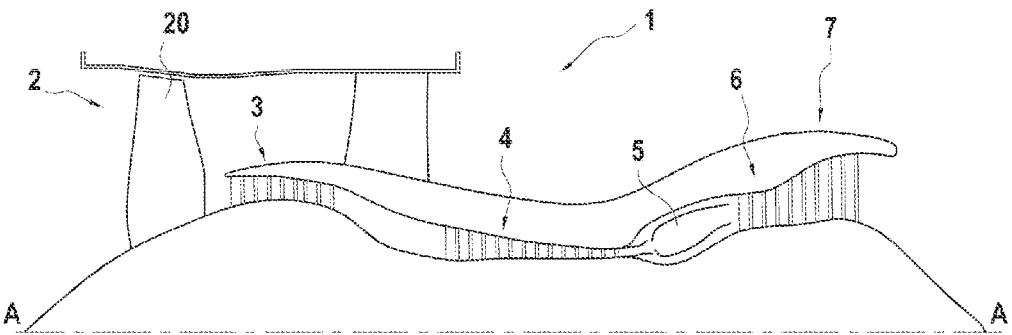
[Fig. 2]
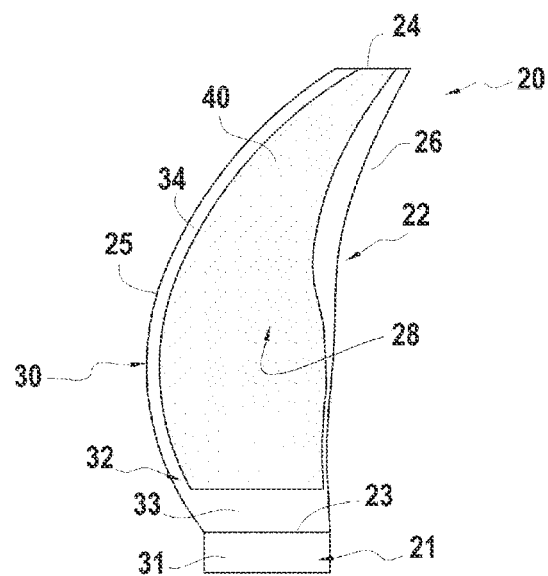
[Fig. 3]
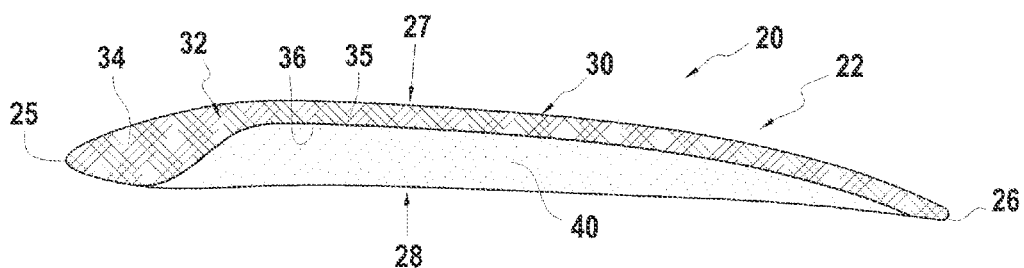

[Fig. 4]
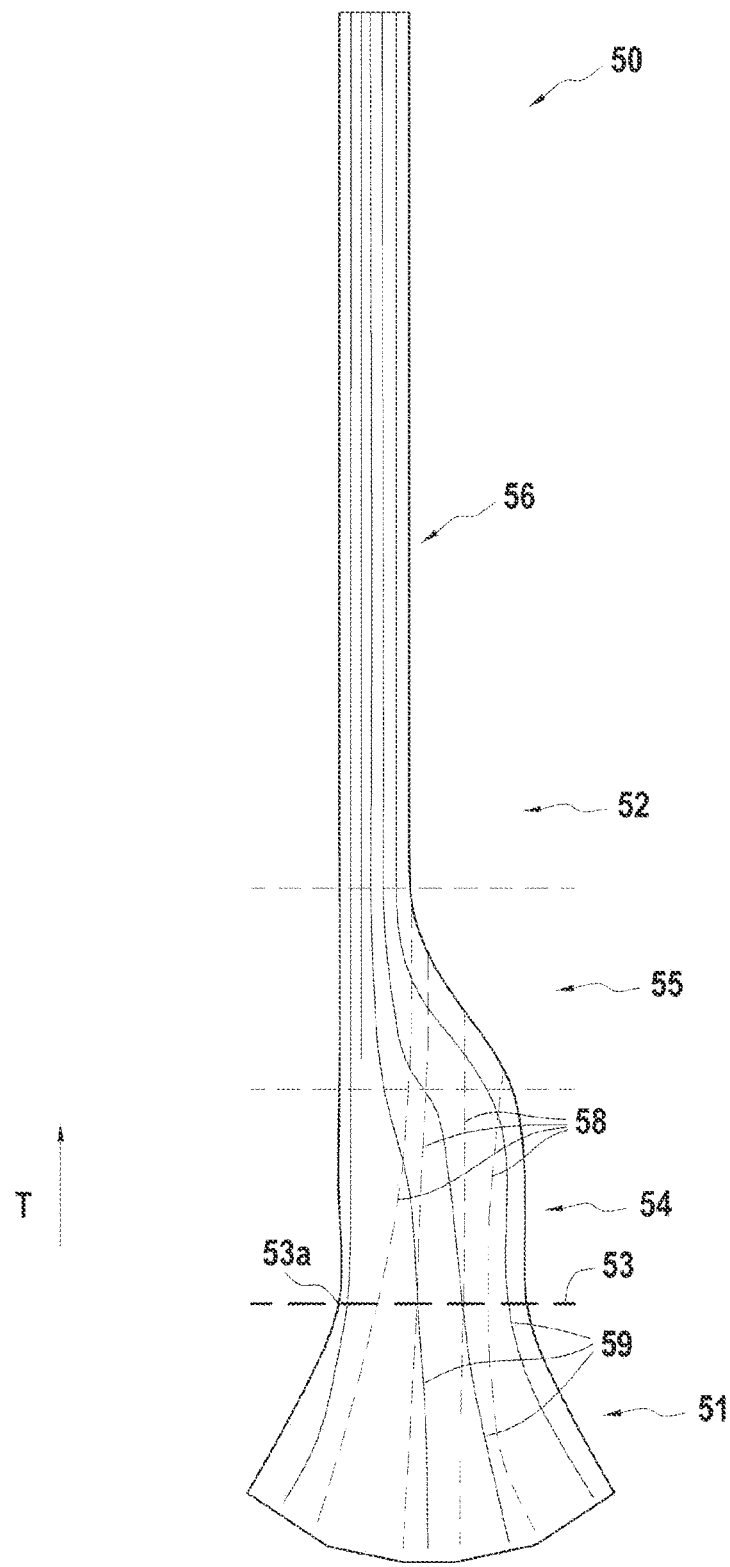

[Fig. 5]
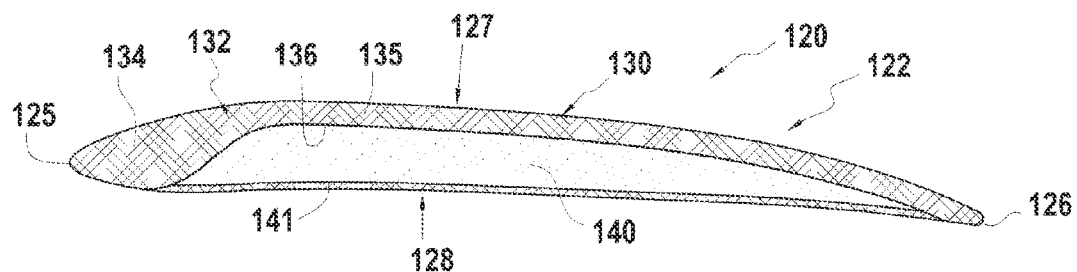

PREFORM FOR A COMPOSITE BLADE

CROSS-REFERENCE TO RELATED APPLICATION(S)

This patent application is the U.S. National Stage entry under 35 U.S.C. § 371 of International Patent Application No. PCT/FR2020/051523, filed on Sep. 2, 2020, which claims the benefit of priority to French Patent Application No. 1909949, filed on Sep. 10, 2019, the '949 application is incorporated by reference herein in its entirety.

TECHNICAL FIELD

This disclosure relates to a fibrous preform for a composite blade and also a composite blade formed by means of such a preform, a rotor and a rotating machine comprising such a blade.

Such a preform can be used to produce large-span blades benefiting from reduced weight. Such blades may in particular be propeller or fan blades of an aircraft turbojet engine for example.

PRIOR ART

In a bypass turbojet engine, in a turbojet engine with an unducted fan (commonly called an open rotor), or else in a turboprop engine, the thrust and the efficiency of the engine increase with the diameter of the fan or of the propeller. Consequently, the current trend is to increase this diameter as much as possible.

However, it is understood that such an increase in diameter of the rotor mechanically leads to an increase in the weight of the rotating machine, due of course to the increase in the size of the blades, but also of all the mechanical structures of the rotor and, where appropriate, the structures of the stator intended to retain the blades in the event of damage.

In addition, this increase in the diameter of the rotor leads to significant mechanical strength problems. In particular, increasing the spans of the blades tends to lower the natural frequencies of these blades, which requires significantly increasing their thickness in order to raise these natural frequencies, further increasing the weight of the blades.

The technological transition having led to the replacement of the old metal blades by composite blades has contributed to reducing the weight of the rotors of turbojet engines; however, given the increasingly stringent requirements in terms of consumption in particular, it is desired to go even further in reducing the weight of these blades.

There is therefore a real need for a fibrous preform for a composite blade and also a composite blade formed by means of such a preform, a rotor and a rotating machine comprising such a blade, which benefit from a further reduced weight.

DISCLOSURE OF THE INVENTION

This disclosure relates to a preform for a composite blade, obtained by three-dimensional weaving, comprising a first longitudinal section, configured to form a blade root, and a second longitudinal section, extending from the first longitudinal section, configured to form a portion of an airfoil, wherein the first longitudinal section has a first thickness at its upper end and, wherein the second longitudinal section includes at least one set-back zone having a thickness at least three times less than the first thickness, the total surface of the set-back zone occupying at least 50% of the surface of the second longitudinal section.

Thus, the preform has a structural root and an airfoil provided with a recess in the lateral surface of the preform: it is then possible to add into this recess a material having an even lower density than that of the preform, in order to obtain a composite blade whose weight is less than that of a similar blade according to the prior art.

In particular, the inventors have determined that this type of large-span blade works mainly in bending, so that the skin of the blade, that is to say its outermost part, plays a mechanical role which is much more significant than its core, that is to say its innermost part.

Consequently, such a preform allows to retain a 3D woven structure, providing very good mechanical strength, in the most mechanically loaded areas of the blade: its root, and at least part of its skin. Conversely, such a preform allows to place a lighter material, generally less mechanically resistant, in the zones of the blade that are less mechanically loaded: essentially its core and a minority portion of its skin.

Thus, it is possible to obtain a lighter blade practically without weakening, in practice, its mechanical strength. Consequently, it is possible to produce blades of very large span, allowing to form rotors of very large diameters.

In some embodiments, the set-back zone has a thickness at least three times less, preferably at least five times less, than the first thickness. The recess formed is thus larger, which allows to reduce the weight of the final blade by the same amount.

In some embodiments, the set-back zone has a thickness less than 7.5 mm, preferably less than 6 mm. The inventors have indeed determined that it was possible to reduce the thickness of the skin down to such values while maintaining satisfactory bending strength for the final blade.

In some embodiments, the set-back zone has a thickness greater than 4.5 mm. The inventors have indeed determined that such a minimum thickness is sufficient to ensure satisfactory bending strength for the final blade.

In some embodiments, the first thickness is greater than 35 mm. More preferably still than 50 mm. The inventors have indeed determined that such a set-back zone is of interest mainly from such a thickness.

In some embodiments, the total surface of the set-back zone occupies at least 65%, preferably at least 80%, of the surface of the second longitudinal section. The recess formed is thus larger, which allows to reduce the weight of the final blade by the same amount.

In some embodiments, the lower end of the set-back zone is located at a distance from the junction between the first and second longitudinal sections greater than 10%, preferably greater than 15%, of the height of the second longitudinal section. The inventors have indeed determined that the frequency behavior of the final blade could be degraded if the set-back zone was located too close to the root of the blade.

In some embodiments, the set-back zone extends to the upper end of the second longitudinal section. Indeed, in some of the applications considered, the blade tip is lightly loaded and can therefore withstand a reduction in its mechanical strength.

In some embodiments, the upper end of the set-back zone is located at a distance from the junction between the first and second longitudinal sections less than 90%, preferably less than 75%, of the height of the second longitudinal section. Indeed, in some of the applications considered, it is preferable to keep a 3D woven structural portion at the blade tip in order to maintain sufficient mechanical strength.

In some embodiments, the second longitudinal section includes a front edge, configured to form a leading edge of the airfoil, and a rear edge, configured to form a trailing edge of the airfoil.

In some embodiments, the front end of the set-back zone is located at a distance from the front edge greater than 15%, preferably greater than 25%, of the distance separating the front edge from the rear edge. Indeed, it is preferable to keep a 3D woven structural portion at the leading edge of the blade in order to be able to withstand shocks against potential obstacles, in the event of ingestion of birds for example.

In some embodiments, the set-back zone extends to the rear edge. Indeed, in some of the applications considered, the trailing edge of the blade is lightly loaded and can therefore withstand a reduction in its mechanical strength.

In some embodiments, the rear end of the set-back zone is located at a distance from the front edge that is less than 95% of the distance separating the front edge from the rear edge. Indeed, in some of the applications considered, it is preferable to keep a 3D woven structural portion at the trailing edge of the blade in order to maintain sufficient mechanical strength therein.

In some embodiments, the second longitudinal section includes a transition zone, provided between the first longitudinal section and the set-back zone, the transition zone having a thickness decreasing in the direction of the set-back zone. Such a transition zone allows to gradually reduce the thickness of the preform between the first longitudinal section, where it is generally the thickest, and the set-back zone: this allows better transmission of forces between these two zones and simplifies the strategy of weaving.

In some embodiments, the transition zone has a layer exit rate greater than 3 layer exits per 100 mm, preferably greater than 5 layer exits per 100 mm. Indeed, such a layer exit rate allows a sufficiently rapid thickness transition between the first longitudinal section and the set-back zone.

In some embodiments, the transition zone has a layer exit rate less than 7 layer exits per 100 mm. This allows to preserve good transmission of forces at the interface between the root of the blade and its blade vane.

In some embodiments, at least 75%, preferably at least 90%, of the layer exits within the transition zone are made on the same side of the second longitudinal section. This allows to maintain a 3D woven structural skin on the surface of at least one side of the blade.

In some embodiments, the layer exits are made on the lower surface side of the preform, that is to say on the side configured to form the lower surface side of the blade. Indeed, the upper surface is generally more curved than the lower surface: as a result, the 3D woven skin maintained on the upper surface side is curved, which pre-stresses the fibers of this skin, leading to greater bending stiffness. Nevertheless, it would also be possible to make the layer exits on the upper surface side of the preform.

In some embodiments, the set-back zone comprises layers of yarns coming from different zones of the first longitudinal section in the transverse direction. In other words, the layer exits preserve some layers of the first longitudinal section which are then brought back to the set-back zone using layer crossings. Thus, the mechanical connection of the set-back zone with the first longitudinal section is reinforced, which reinforces the mechanical strength of the final blade.

In some embodiments, the set-back zone comprises layers of yarns coming from the entire thickness of the first longitudinal section. Thus, the set-back zone is mechanically connected to the entire thickness of the first longitudinal section, which ensures very good mechanical strength of the final blade.

In some embodiments, at least one layer of yarns located on the surface of the set-back zone is also located on the surface of the first longitudinal section. Preferably, this is true for both lateral surfaces of the preform. Thus, surface continuity, and therefore a reinforced mechanical strength, is ensured between the first longitudinal section and the set-back zone.

In some embodiments, the second longitudinal section is curved. As explained, this allows, on the one hand, to form the curvature of the final blade and, on the other hand, to reinforce the bending strength of the final blade.

In some embodiments, the set-back zone is unique. The preform thus includes a single recess. In addition, the second longitudinal section is solid, in particular devoid of an inner chamber.

In some embodiments, the yarns used for weaving the preform are carbon fibers. However, it can be any other type of yarn, for example glass fiber or Kevlar.

In some embodiments, the weave used for the three-dimensional weaving of the preform may be of the 3D interlock type. However, the weaving of the outer surfaces of the preform can be essentially two-dimensional, of the satin type for example.

This disclosure also relates to a composite blade, comprising a main part, made of composite material by means of a preform having a first longitudinal section and a second longitudinal section, the second longitudinal section including a set-back zone forming a recess in the main part, and a filler block, attached in the recess of the main part and whose density is strictly lower than that of the main part.

In particular, the preform of this blade may correspond to any of the previous embodiments, the blade thus benefiting from the corresponding technical advantages and effects mentioned above. Preferably, said preform has been shaped in a mold and embedded in a matrix.

In some embodiments, the density of the filler block is at least 10 times lower than that of the main part. This allows to reduce the weight of the blade by the same amount.

In some embodiments, the filler block is made of foam, for example polyimides or polymethacrylimides (Rohacell 110XT-HT in particular). Indeed, the foams benefit from a reduced density.

In some embodiments, the blade comprises an airfoil including a leading edge, a trailing edge, an upper surface and a lower surface, In some embodiments, the entire upper surface is formed by the main part. Here this refers to the structure of the upper surface, without taking into account any surface coatings deposited or added onto the surface of the upper surface. As explained, this ensures good mechanical bending strength. However, in other embodiments, the main part could form the entire lower surface.

In some embodiments, the entire leading edge is formed by the main part. Here this refers to the structure of the leading edge, without taking into account any surface coatings or reinforcements deposited or added onto the surface of the leading edge. As explained, this ensures good mechanical strength in the event of impact with an obstacle, for example when ingesting a bird.

In some embodiments, the entire trailing edge is formed by the main part. Here this refers to the structure of the trailing edge, without taking into account any surface coatings or reinforcements deposited or added onto the surface of the trailing edge. As explained, this ensures good mechanical strength at the leading edge, which may be desired depending on the intended application.

In some embodiments, the filler block is glued into the recess of the main part. It can however be attached using other techniques, for example by injection and/or molding.

In some embodiments, at least one impregnated textile fold is attached at least in part to the filler block. It can be a single fold or an overlay of folds, each fold preferably being two-dimensional. Preferably, the fold(s) fully cover the filler block. Such a fold allows to protect the filler block and to reinforce its strength in operation.

In some embodiments, a metal profile is attached to the leading edge and/or the trailing edge. This allows to reinforce these parts of the blade against shocks in particular.

In some embodiments, a polymer film, for example made of polyurethane, is attached to at least a portion of the airfoil. This allows to protect the airfoil from certain environmental conditions.

In some embodiments, the length of the blade is greater than 900 mm. Even more preferably greater than 1200 mm.

In some embodiments, the maximum thickness at the neck of the blade is greater than 35 mm. Even more preferably greater than 50 mm.

In some embodiments, the blade is a rotor blade, for example of the fan or propeller blade type. However, it may also be a stator vane, for example of the deswirler type.

In some embodiments, the matrix is of the organic type. It may in particular be an epoxy resin.

This disclosure also relates to a rotor, comprising a composite blade according to any one of the preceding embodiments. It may in particular be a fan, which is ducted or not, or a propeller. Preferably, the rotor is configured to rotate at rotational speeds such that the speed of the end of the blades does not exceed that conventionally known for a turboprop engine or an engine propeller of the open-rotor type.

This disclosure also relates to a rotating machine comprising a composite blade or a rotor according to any one of the preceding embodiments.

In this disclosure, the terms "longitudinal", "transverse", "lower", "upper" and their derivatives are defined relative to the main direction of the blades; the terms "axial", "radial", "tangential", "inner", "outer" and their derivatives are defined relative to the main axis of the turbomachine; "axial plane" means a plane passing through the main axis of the turbomachine and "radial plane" means a plane perpendicular to this main axis; finally, the terms "upstream" and "downstream" are defined in relation to the circulation of air in the turbomachine.

"Three-dimensional weaving" means a weaving technique wherein weft yarns circulate within a matrix of warp yarns so as to form a three-dimensional network of yarns according to a three-dimensional weave: all the layers of yarns of such a fibrous structure are then woven during the same weaving step within a three-dimensional loom.

In this disclosure, unless otherwise stated, the expressions "less" and "greater" are understood in the broad sense, that is to say the sense encompassing the case where the two values considered are equal.

The aforementioned features and advantages, as well as others, will appear upon reading the detailed description which follows, of proposed exemplary embodiments of the preform and of the composite blade. This detailed description refers to the appended drawings.

BRIEF DESCRIPTION OF THE DRAWINGS

The appended drawings are schematic and are intended above all to illustrate the principles of the disclosure.

In these drawings, from one figure to another, identical elements (or parts of elements) are identified by the same reference signs. Furthermore, elements (or parts of element) belonging to different exemplary embodiments but having a similar function are marked in the figures by numerical references incremented by 100, 200, etc.

FIG. 1 is a sectional plan of a turbomachine according to the description.

FIG. 2 is a side view of a composite blade according to a first example.

FIG. 3 is a sectional view of the composite blade according to the first example.

FIG. 4 schematically illustrates the preform corresponding to this first example.

FIG. 5 is a sectional view of a composite blade according to a second example.

DESCRIPTION OF EMBODIMENTS

In order to make the description more concrete, examples of composite preforms and blades are described in detail below, with reference to the appended drawings. It is recalled that the invention is not limited to these examples.

FIG. 1 shows, in section along a vertical plane passing through its main axis A, a bypass turbojet engine 1 according to the disclosure. It includes, from upstream to downstream according to the circulation of the air flow, a fan 2, a low pressure compressor 3, a high pressure compressor 4, a combustion chamber 5, a high pressure turbine 6, and a low pressure turbine 7.

The fan 2 comprises a plurality of fan blades 20. As shown in FIGS. 2 and 3, each fan blade comprises a root 21 and an airfoil 22.

The root 21 has a dovetail shape allowing it to engage in one of the cells of a fan disk secured to a rotary shaft of the turbomachine in order to fix the fan blade 20 on the fan disc. Thus, the fan disc and the plurality of fan blades 20 form a rotor driven by one of the turbines 6, 7, generally the low pressure turbine 7.

The airfoil 22 in turn extends between the junction 23 with the root 21 and the upper end 24 of the blade, also called the blade tip: it has a leading edge 25, a trailing edge 26, a curved upper surface 27, and a lower surface 28, which is substantially less curved than the upper surface 27.

In the first example, each fan blade 20 is formed by a main part 30 and a filler block 40. The main part 30 includes, in one piece, a first longitudinal section 31, forming the root 21 of the blade 20, and a second longitudinal section 32 forming only a portion of the airfoil 22 of the blade 20.

More specifically, this second longitudinal section 32 has a first solid portion 33 along the junction 23 between the root 21 and the airfoil 22 of the blade 20, a second solid portion 34 along the leading edge 25 of the blade 20, and a wall 35, extending from the first solid portion 33 to the tip 24 of the blade 20 and from the second solid portion 34 to the trailing edge 26 of the blade 20, the outer surface of which forms the upper surface 27 of the blade and the inner surface of which forms a recess 36 wherein the filler block 40 is attached.

The main part 30 is made of composite material from a three-dimensionally woven preform 50. This preform 50 is shown schematically in FIG. 4, only a few weft yarns 58, 59 being shown. This preform 50 will be described from upstream to downstream in the weaving direction T, that is to say from the bottom to the top of FIG. 4. It goes without saying, however, that the weaving could be carried out from the other end and in the other direction.

In this exemplary embodiment, the preform 50 is woven three-dimensionally from carbon fibers according to a 3D interlock weave. Only the surfaces of the preform 50 are woven two-dimensionally according to a satin-type weave.

At the upstream end, the weaving begins the production of a first longitudinal section 51 intended to form the first longitudinal section 31 of the main part 30 of the blade 20, that is to say the root 21 of the blade 20. The first longitudinal section 51 is the section of the preform 50 having the most layers of bonded yarns, and therefore the greatest thickness. This thickness gradually decreases downstream so as to form a dovetail until it reaches a neck 53a marking the upper end of the first longitudinal section 51.

Downstream of the first longitudinal section 51, then begins a second longitudinal section 52, intended to form the second longitudinal section 32 of the main part 30 of the blade 20, extends to the downstream end of the preform 50. The height of the second longitudinal section 52 thus corresponds to the distance separating the junction 53 between the first and second longitudinal sections 51, 52 and the upper end of the preform 50.

In a first zone 54, or stilt zone, from the junction 53 between the first and second longitudinal sections 51, 52, the thickness of the preform 50 is kept substantially constant. This stilt zone 54 is intended to form the first solid portion 33 of the main part 30.

Then, in a second zone 55, or transition zone, layer exits are produced gradually along the weave T so as to gradually reduce the thickness of the preform 50 in this transition zone 55. More specifically, some layers of weft yarns 58 are selected and taken out of the preform 50, gradually, from the lower surface towards the upper surface, and regularly sparing some layers of weft yarns 59 which are then brought back to the upper surface side using layer crossings.

Weaving methods allowing such layer exits are now well known in the field of 3D weaving. Concretely, the weft yarns concerned 58 are caused to leave some warp yarns free, called "floats" which, detached from any weft yarn, "float" and can thus be eliminated later by shaving: whole or partial layers can thus be eliminated, which allows to reduce the thickness of some areas of the preform.

Weaving methods allowing such layer crossings are now well known in the field of 3D weaving. In the layer crossing zone, a first given weft yarn, joining the warp yarns of a given layer, is diverted transversely in order to join, downstream of the layer crossing zone, the warp yarns of a neighboring layer, while a second weft yarn coming from said neighboring layer is diverted in the opposite direction to take up the layer of warp yarns abandoned by the first weft yarn. Thus, the two weft yarns intersect at the layer crossing zone. The weft yarns can thus deviate from one or more layers of weft yarns, alone or in groups, once or several times.

Finally, once the desired reduction in thickness has been achieved, a third zone 56, or set-back zone, is made to the downstream end of the preform 50, that is to say its upper end. This set-back zone 56 has a much smaller thickness than that of the first longitudinal section 51 at its junction 53 with the second longitudinal section 52. This set-back zone 56 is intended to form the recess 36 of the main part 30 of the blade 20.

In this regard, it is noted that FIG. 4 shows the weaving strategy of the preform 50 in the plane of the recess 36 and therefore has a set-back zone 56; however, it is naturally understood that the preform 50 does not have such a set-back zone along its front edge corresponding to the leading edge 25 of the blade 20, that is to say in the zone corresponding to the second massive portion 34 of the main part 30 of the blade 20.

Once the weaving is finished, the floats from the layer exits are shaved. The preform 50 is then moistened to make it more flexible and allow easier deframing of the fibers. It is then introduced into a forming mold whose interior space is adjusted to the desired geometry for the preform 50.

The preform 50 is then dried so that it stiffens, thus blocking the geometry imposed during shaping. The preform 50 is finally disposed in an injection mold, with the dimensions of the desired main part 30, into which a matrix, here an epoxy resin, is injected. Such an injection can for example be carried out by the known RTM ("resin transfer molding") method. At the end of this step, a composite material main part 30 composed of a preform 50 woven from carbon fibers embedded in an epoxy matrix, is then obtained. Machining steps can optionally complete this method to finalize the main part 30.

The filler block 40 is in turn made of foam, polyimides or polymethacrylimides for example, machined alongside the recess 36 of the main part 30. The filler block 40 is then attached by gluing within the recess 36 so as to obtain, after a possible last machining, the final blade 20.

FIG. 5 illustrates a second exemplary embodiment of a fan blade 120 completely similar to the first example, except that it further comprises a stack of textile folds 141 attached to the lower surface 128 of the blade 120 so as to completely cover the filler block 140.

These two-dimensional folds 141 are preferably made of the same material as the preform, here of carbon fibers. They are pre-impregnated using a polymeric matrix preferably identical to that impregnating the preform, here an epoxy resin.

These folds 141 are attached after the manufacture of the main part 130 of the blade 120 and after the placement of the filler block 140 within the recess 136.

Although the present invention has been described with reference to specific embodiments, it is obvious that modifications and changes can be made to these examples without departing from the general scope of the invention as defined by the claims. In particular, individual features of the different illustrated/mentioned embodiments can be combined in additional embodiments. Accordingly, the description and the drawings should be considered in an illustrative rather than restrictive sense.

It is also obvious that all the features described with reference to a method can be transposed, alone or in combination, to a device, and conversely, all the features described with reference to a device can be transposed, alone or in combination, to a method.

The invention claimed is:

1. A preform for a composite blade, obtained by three-dimensional weaving, comprising:
   a first longitudinal section, configured to form a blade root, and
   a second longitudinal section, extending from the first longitudinal section, configured to form a portion of an airfoil,
   wherein the first longitudinal section has a first thickness at its upper end,
   wherein the second longitudinal section includes at least one set-back zone, forming a recess in the lateral surface of the preform, having a thickness at least three times less than the first thickness, the total surface of the set-back zone occupying at least 50% of the surface of the second longitudinal section, wherein the second longitudinal section includes a transition zone, provided between the first longitudinal section and the set-back zone, the transition zone having a thickness decreasing in the direction of the set-back zone, and wherein the transition zone has a layer exit rate greater than 5 layer exits per 100 mm.

2. The preform according to claim 1, wherein at least 75% of the layer exits within the transition zone are made on the same side of the second longitudinal section.

3. The preform according to claim 1, wherein the set-back zone has a thickness less than 7.5 mm.

4. The preform according to claim 1, wherein the lower end of the set-back zone is located at a distance from the junction between the first and second longitudinal sections greater than 10% of the height of the second longitudinal section.

5. The preform according to claim 1, wherein the second longitudinal section includes a front edge, configured to form a leading edge of the airfoil, and a rear edge, configured to form a trailing edge part of the airfoil, and wherein the front end of the set-back zone is located at a distance from the front edge greater than 15% of the distance separating the front edge from the rear edge.

6. The preform according to claim 1, wherein the set-back zone comprises layers of yarns coming from different zones of the first longitudinal section in the transverse direction.

7. The composite blade, comprising
a main part, made of composite material by means of the preform according to claim 1, the set-back zone of the preform forming a recess in the main part, and
a filler block, attached in the recess of the main part and whose density is lower than that of the main part.

8. The composite blade according to claim 7, wherein the filler block is made of foam.

9. The composite blade according to claim 7, wherein at least one impregnated textile fold is attached at least in part to the filler block.

10. A rotor, comprising the composite blade according to claim 7.

11. A rotating machine, comprising the composite blade according to claim 7.

* * * * *